United States Patent [19]

Hancock et al.

[11] 4,377,555

[45] Mar. 22, 1983

[54] REMOVAL OF METAL FROM SOLUTION

[75] Inventors: Ronald D. Hancock, Weybridge, England; Ian V. Howell, Porthcawl, Wales

[73] Assignee: The British Petroleum Company Limited, London, England

[21] Appl. No.: 819,560

[22] Filed: Jul. 27, 1977

[30] Foreign Application Priority Data

Jul. 29, 1976 [GB] United Kingdom ............... 31636/76

[51] Int. Cl.³ ....................... B01D 15/00; B01D 15/02
[52] U.S. Cl. ......................................... 423/6; 252/430; 252/431 R; 422/55; 422/56; 423/29; 423/89; 210/682; 210/688
[58] Field of Search ........................... 423/8, 6, 25, 29; 23/253 TP; 260/448.2 B, 448.2 R; 252/408, 430, 431; 195/103.5 R; 210/24; 21/682, 688; 422/55, 56

[56] References Cited

U.S. PATENT DOCUMENTS

| | | |
|---|---|---|
| 2,859,093 | 11/1958 | Russell et al. ............................ 423/6 |
| 2,901,496 | 8/1959 | Gowan ................................ 423/8 X |
| 2,903,333 | 9/1959 | Lowe et al. ............................... 423/6 |
| 2,992,249 | 7/1961 | Boyd et al. .............................. 423/6 |
| 3,320,033 | 5/1967 | Goren ..................................... 423/6 |
| 3,773,889 | 11/1973 | George et al. ........................... 423/6 |
| 3,904,373 | 9/1975 | Harper ............................ 252/408 X |

FOREIGN PATENT DOCUMENTS 443579  5/1976  U.S.S.R. ................................. 423/6

OTHER PUBLICATIONS

Harper, G. B., "Reusable Glass-Bound pH Indicators", Pub. in *Anal. Chem.*, 47(2): 348-351, 1975.
Karrer, P., *Organic Chemistry*, 4th Eng. Ed., 1950, Elsevier Pub. Co., N.Y., p. 507.

*Primary Examiner*—Deborah L. Kyle
*Attorney, Agent, or Firm*—Morgan, Finnegan, Pine, Foley & Lee

[57] ABSTRACT

A functionalized silica is prepared by reacting silica with a silane and an aromatic hydroxy aldehyde. The product is useful for removing metals from solution, e.g., Cu from ATK, or in the extraction of U from solutions arising from the processing of its ores.

7 Claims, No Drawings

REMOVAL OF METAL FROM SOLUTION

The present invention relates to the removal of heavy metals, transition metals and actinide metals from organic solution and in particular to the removal of copper, lead or uranium from solution.

As a result of previous refining processes, traces of copper are sometimes in distillate fuels such as automotive and aviation gasolines and aviation kerosines. Copper is undesirable because it is an oxidation catalyst which promotes the formation of gums and resins which affect the performance of an engine. It is current practice to combat the adverse effect of copper by adding a copper deactivator to the fuel.

A further problem which is assuming increasing importance from the point of view of environmental protection is the removal of lead from automotive gasolines. As a result of pressure for the reduction of lead levels, low lead and lead-free gasolines are becoming available, but these cannot be used in equipment previously used to convey or dispense gasoline with higher lead levels because of the risk of contamination unless the equipment is thoroughly cleaned.

As a result of the growing demand for uranium as a nuclear fuel, the recovery of uranium from solutions produced in the hydrometallurgical processing of uranium bearing materials is also of major importance.

We have now discovered a material which can be used for removing metals from solutions.

Thus according to one aspect of the present invention there is provided a product, suitable for the removal of heavy metals, transition metals and actinide metals from solution, obtained by reacting an inorganic solid containing surface hydroxyl group with a compound of formula (I)

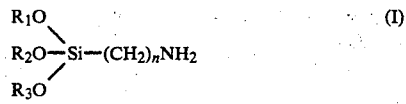

wherein $R_1$, $R_2$ and $R_3$ which may be the same or different are organic radicals, preferably alkyl, containing up to 20 carbon atoms, and n is an integer from 1 to 10, and an aromatic hydroxy aldehyde.

The inorganic solid containing surface hydroxyl groups may be alumina, titania, zirconia, glass, sepiolite, or a zeolite molecular sieve. Preferably the inorganic solid is silica and more preferably silica gel. In addition mixtures of inorganic solids may be used. Unless they have been subjected to severe treatments, e.g. heating above 1000° C., all commercial silicas contain surface hydroxyl groups. However for the removal of metals from alkaline media, under which conditions silica would be chemically attacked, it is preferred to employ an alkali resistant inorganic solid containing surface hydroxyl groups.

$R^1$, $R^2$ and $R^3$ in the compound of formula (I) may be alkyl or aryl, radicals and may be the same or different. Preferably $R^1$, $R^2$ and $R^3$ are identical alkyl groups containing 1 to 3 carbon atoms.

Suitable aromatic hydroxyaldehydes include salicylaldehyde and substituted σ-hydroxybenzyaldehydes.

The order of reaction is not critical provided that the compound of Formula (I) is one of the initial reactants. It may be reacted with either the inorganic solid or the hydroxy aromatic aldehyde and the resulting intermediate reacted with the third reactant.

In the case of silica and the compound of Formula I, the intermediate is believed to be formed by the reaction represented by the following equation:

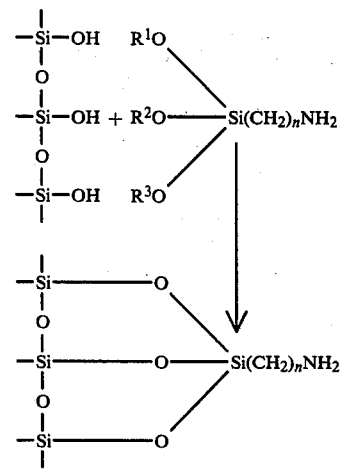

In the case of the compound in Formula I and the hydroxy aromatic aldehyde, the intermediate is believed to be formed by the reaction represented by the following equation.

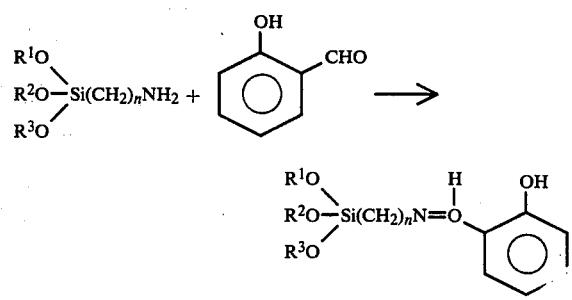

However, the invention is not intended to be restricted in any way by the above equations representing the formation of the substrate.

The reactions may be effected by warming the reactants together, e.g. under reflux in the presence of an inert solvent, for about 1 to 3 hours, and thereafter separating the products. A suitable solvent is toluene.

According to another aspect of the present invention there is provided a process for the removal of heavy metals, transition metals and actinide metals from solution with the final reaction product as hereinbefore described and recovering an effluent of reduced metal content.

The term heavy metal within the context of the present application is intended to mean those metals in the B sub-groups of Groups I to VI of the Periodic Table according to Mendeleef. The process is particularly applicable to the removal of the heavy metals copper and lead. Transition metal within the context of this application is defined as a metal which has an incomplete d-shell of electrons in its electronic configuration. The term transition metal may be further sub-divided into non-noble transition metals e.g. manganese, iron and cobalt, and noble transition metals, which are transition metals generally considered to be highly resistant to oxidation. The term actinide metal is defined as a metal with an atomic number equal to or greater than 89 in the Periodic Table of the Elements.

It is clearly economically advantageous to operate at ambient temperature and in most cases, if not all, the substrate will function effectively at this temperature. It will also remove metals at higher temperatures if the feedstock is supplied at elevated temperature.

The substrate is thought to remove the metals by complex compound formation through the donor ligands bonded to the silica surface.

When the substrate loses its activity for removing metals it may either be disposed of without removing the metals or the metals may be removed by means known to those skilled in the art.

The solution containing metals may be contacted with the substrate batchwise, or, preferably, continuously by passing the solution over a bed of the substrate mounted in a suitable reactor.

The invention is illustrated by the following Examples:

EXAMPLE A

Acid washed silica gel (100 g) was suspended in dry toluene (2 litres) and $(Eto)_3SiCH_2CH_2CH_2NH_2$ (80 ml) added. The mixture was stirred and warmed to reflux for 6 hours and the alcohol produced collected in a Dean and Stark apparatus, which was periodically drained. After cooling to room temperature the silica was transferred to a Soxhlet apparatus, extracted with dry toluene for 8 hours and finally dried in vacuo. On analysis the material contained 1.8 percent nitrogen.

20 g of the above nitrogen containing silica was suspended in dry toluene (300 ml) and salicylaldehyde (20 ml) added. The mixture was stirred and warmed to reflux for 1 hour. Water was distilled from the reaction mixture and collected in a Dean and Stark receiver, which was periodically drained. The silica became yellow in colour. After cooling to room temperature, the silica was transferred to a Soxhlet apparatus and extracted with dry toluene overnight. The product was dried in vacuo.

EXAMPLE B $(EtO)_3SiCH_2CH_2CH_2NH_2$ (21.7 g) was dissolved in dry toluene (250 ml) and salicylaldehyde (13.4 g) added. The mixture was stirred and warmed to reflux for 1 hour. The water produced was collected in a Dean and Stark receiver, which was periodically drained. After cooling to room temperature, the product solution was added to acid washed silica gel (20 g) suspended in toluene (300 ml). The mixture was stirred and warmed to reflux for 3 hours during which time any alcohol liberated was collected in a Dean and Stark receiver, which was periodically drained. After cooling to room temperature, the silica was transferred to a Soxhlet apparatus and exhaustively extracted with dry methanol.

On analysis the yellow silica product contained 0.45 percent nitrogen.

EXAMPLE 1

1000 ml of a toluene solution of copper 2-ethyl hexanoate containing 450 ppb copper was stirred with 2 g of the silica containing surface groups of the type

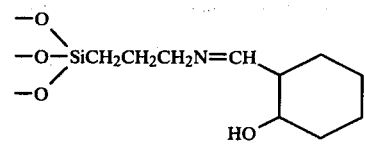

produced as in Example A at room temperature for 6 hours. After this time analysis showed the toluene solution to contain 90 ppb of copper.

EXAMPLE 2

1000 ml of a toluene solution of copper 2-ethyl hexanoate containing 450 ppb copper was stirred with 2 g of the silica prepared as described in Example A at room temperature for 59 hours. After this time analysis showed the toluene solution to contain <25 ppb of copper.

EXAMPLE 3

A concentrated solution of Jet A-1-Aviation Spirit containing 135 ppb soluble copper, was passed over a fixed bed of silica (2 ml), prepared as described in Example B, at room temperature and at a liquid space velocity of 9.9–10.1. Samples were periodically removed and analysed for copper content. The analyses are given in Table 1 below.

TABLE 1

| Hours on Stream | ppb Copper in Product |
|---|---|
| 1–2 | 24 |
| 3–4 | <20 |
| 4–5 | <20 |
| 6–7 | <20 |

We claim:

1. A product, suitable for the removal of heavy metals, transition metals and actinide metals from solution, obtained by reacting (a) an inorganic solid containing surface hydroxyl groups with (b) a compound of formula (I)

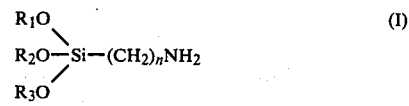

wherein $R_1$, $R_2$ and $R_3$, which may be the same or different, are organic radicals containing up to 20 carbon atoms, and n is an integer from 1 to 10, and (c) an aromatic ortho hydroxyaldehyde.

2. A product according to claim 1 wherein the inorganic solid containing surface hydroxyl groups is alumina, titania, zirconia, glass, sepiolite or a zeolite molecular sieve.

3. A product according to claim 1 wherein the inorganic solid containing surface hydroxyl groups is silica.

4. A product according to claim 1 wherein $R_1$, $R_2$ and $R_3$ are alkyl or aryl radicals and may be the same or different.

5. A product according to claim 4 wherein $R_1$, $R_2$ and $R_3$ are identical alkyl groups containing 1 to 3 carbon atoms.

6. A product according to claim 1 wherein the hydroxy aromatic aldehyde is salicylaldehyde.

7. A process for the removal of heavy metals, transition metals and actinide metals from solution by contacting the solution with a product according to claim 1.

* * * * *